United States Patent [19]

Honka

[11] Patent Number: 5,106,568
[45] Date of Patent: Apr. 21, 1992

[54] METHOD AND APPARATUS FOR VACUUM BAG MOLDING OF COMPOSITE MATERIALS

[75] Inventor: Paul J. Honka, St. Louis, Mo.

[73] Assignee: McDonnell Douglas Corporation, St. Louis, Mo.

[21] Appl. No.: 793,010

[22] Filed: Nov. 15, 1991

[51] Int. Cl.⁵ .............................................. B29B 09/04
[52] U.S. Cl. .................................. 264/510; 264/258; 264/313; 425/388; 156/286
[58] Field of Search .............. 264/510, 511, 512, 102, 264/257, 258, 313, 319, 324, 571; 425/112, 387.1, 388, 420; 156/87, 286, 285

[56] References Cited

U.S. PATENT DOCUMENTS

| | | | |
|---|---|---|---|
| 3,575,756 | 4/1971 | Maus | 156/286 |
| 3,666,600 | 5/1972 | Yoshino | 264/510 |
| 4,065,340 | 12/1977 | Dickerson | 156/286 |
| 4,197,339 | 4/1980 | Paul et al. | |
| 4,311,661 | 1/1982 | Palmer | 264/102 |
| 4,350,545 | 9/1982 | Garabedian | 264/102 |
| 4,562,033 | 12/1985 | Johnson et al. | 264/510 |
| 4,773,021 | 9/1988 | Harris et al. | |
| 4,942,013 | 7/1990 | Palmer et al. | |

Primary Examiner—Jay H. Woo
Assistant Examiner—Jeremiah F. Durkin II
Attorney, Agent, or Firm—Timothy H. Courson; Benjamin Hudson, Jr.; Guy R. Gosnell

[57] ABSTRACT

A method and apparatus for vacuum bag molding of composite materials which eliminates the need for a porous release sheet. Prepregs are placed on a forming tool and overlayed with at least one sheet of nonporous material and a breather sheet and then enclosed within an impermeable membrane. The volume enclosed by the membrane is evacuated, the resin in the prepregs is outgassed, and the prepregs are coalesced to mold the prepregs to the shape of the forming tool. After curing the resin, the temperature is reduced and the resultant article is removed from the forming tool.

5 Claims, 1 Drawing Sheet

METHOD AND APPARATUS FOR VACUUM BAG MOLDING OF COMPOSITE MATERIALS

BACKGROUND OF THE INVENTION

This invention relates to a method and apparatus for vacuum bag molding of composite materials.

A common method of manufacturing articles from composite materials involves laying up a number of sheets of uncured resin-impregnated filaments called "prepregs" on a suitable forming tool, subjecting the prepregs to heat and pressure in order to coalesce the sheets, molding the prepregs to the configuration of the conforming tool, and subsequently gelling the resin. Finally, the resin is cured by further heat treatment to fix the resultant configuration of the molded article.

Vacuum bag molding is often employed to carry out this method wherein the laid-up prepregs are placed on the forming tool and then enclosed by an impermeable membrane commonly referred to as a "vacuum bag." The volume enclosed by the vacuum bag is evacuated and the assembly is heated up on a rising temperature schedule, and the prepregs coalesce to form the molded article. The rising temperature schedule ensures that the uncured resin is sufficiently mobile to permit maximum consolidation.

In typical vacuum bag molding, the vacuum bag assembly includes a forming tool, prepreg sheets, a porous release sheet, a breather material, and the vacuum bag. The conventional vacuum bag approach requires pores in the release sheet—it is widely believed by those skilled in the art that a porous release sheet is essential to allow gases and vapors (i.e.,volatiles) to escape through a path normal to the prepregs.

While the conventional vacuum molding method can provide an effective method of manufacturing articles from composite materials, it would be desirable to employ a nonporous release sheet for the vacuum bag molding process. Using a nonporous release sheet would provide an inexpensive alternative to the porous release sheet and therefore reduce composite part production cost.

SUMMARY OF THE INVENTION

The apparatus and method of the present invention for vacuum bag molding of organic matrix composites utilize a nonporous release sheet instead of a porous release sheet which was previously thought to be essential in vacuum bag molding processes.

The apparatus disclosed herein includes a forming tool, a plurality of uncured resin-impregnated filaments ("prepregs"), at least one sheet of nonporous material, a breather sheet, an impermeable membrane, an evacuation means, and a heat and pressure source. A porous release sheet is not required in the present invention.

The method of vacuum bag molding of organic matrix composites comprises the steps of: (1) laying up a plurality of prepregs on the forming tool, (2) overlaying the prepregs with at least one sheet of the nonporous material, (3) overlaying the nonporous material with the breather sheet, (4) enclosing the prepregs, the nonporous sheet(s), and the breather material within an impermeable membrane, (5) evacuating the volume enclosed by the membrane, (6) outgassing the resin in the prepregs, (7) coalescing the prepregs, (8) curing the resin in the prepregs, and (9) removing the resultant article from the forming tool.

BRIEF DESCRIPTION OF THE DRAWING

Other objects, features, and advantages of the present invention will become more fully apparent from the following detailed description of the preferred embodiment, the appended claims, and the accompanying drawings in which:

DETAILED DESCRIPTION OF THE PREFERRED EMBODIMENT

Upon experimentation, the inventor of the present invention unexpectedly discovered that a porous release sheet is not essential—as previously thought—for escape of volatiles in vacuum bag molding. As such, the method and apparatus for vacuum molding composites material in the present invention involves blocking the normal bleed path of volatiles by replacing the porous release sheet with a nonporous release material. Elimination of the porous release sheet in vacuum bag molding reduces layup labor, improves control of resin content, and eliminates resin gradients and the curvatures and stresses associated with them. Since only edge bleeding of the resin occurs, saving of raw resin material is achieved.

While not wishing to be bound by theory, it is believed that the advantageous results of the invention are obtained as a result of the rising temperature schedule, wherein such schedule causes a pressure gradient to build up under the nonporous release sheet. The forces resulting from the pressure gradient lift the nonporous sheet up, allowing volatiles to move across the top surface of the prepregs and escape through vacuum ports in the vacuum bag assembly.

Figure 1:
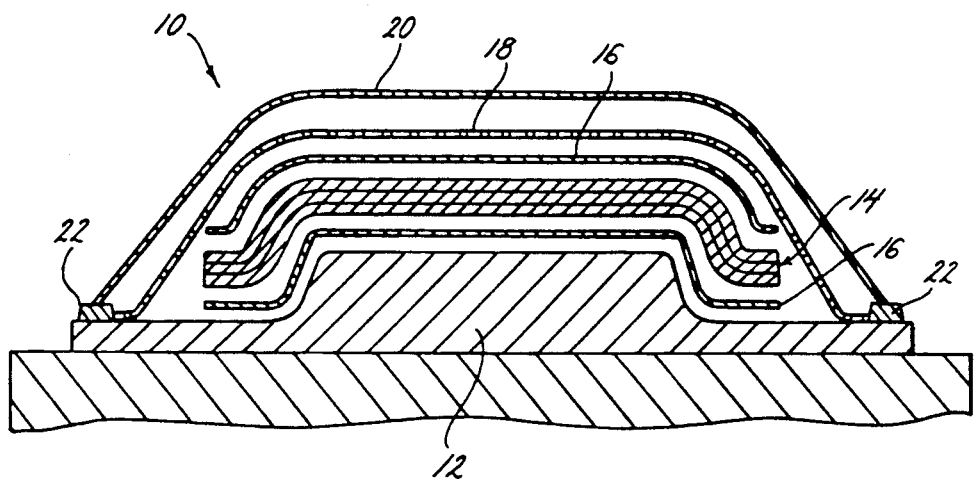
FIG. 1 is a sectioned side view of the apparatus for carrying out the method of the present invention.

A preferred embodiment of the vacuum bag assembly for carrying out the method of the present invention is shown in FIG. 1. Vacuum bag assembly 10 includes a forming tool 12, a plurality of prepregs 14, at least one nonporous release sheet 16, a breather material 18, and an impermeable membrane 20 which is used as the vacuum bag. The plurality of prepregs 14 are sheets of uncured resin-impregnated filaments.

The plurality of prepregs 14 are laid up on forming tool 12. The laid up prepregs 14 are then overlayed with at least one nonporous release sheet 16. An additional nonporous release sheet 16 may be sandwiched between forming tool 12 and the plurality of prepregs 14, if desired. Nonporous release sheet 16 is overlayed with breather material 18. The assembly of laid up prepregs 14, nonporous release sheet 16 and breather material 18 is then enclosed by impermeable membrane 20 which is sealed to the outer edges of forming tool 12 with a suitable sealant material 22.

The volume which is enclosed by vacuum bag assembly 10 is then evacuated by a vacuum pump (not shown) for preconsolidation of the prepregs. After pre-consolidation, the resin in the prepregs is outgassed and the prepreg sheets are coalesced. The temperature within vacuum bag assembly 10 is increased and maintained so that the resin in the prepregs outgasses and becomes mobile enough for the prepregs to coalesce and conform to the shape of forming tool 12. The resin subsequently gels and the temperature within vacuum bag assembly 10 is further increased to cure the resin in the prepregs. In the preferred embodiment, the temperature and pressure within vacuum bag assembly 10 is increased by placing vacuum bag assembly 10 in an autoclave (not shown). In alternative embodiments, heating and pressurizing can be carried out by any suitable means such as an oven, hot plate, compression tool, hydroclave, Thermoclave ™ (from United Technologies), etc. Finally, the temperature of vacuum bag assembly 10 is decreased and vacuum bag assembly 10 is dismantled for removal of the molded composite part.

The method and apparatus of the present invention will be further clarified by a consideration of the following example, which is intended to be purely exemplary of the invention.

EXAMPLE

Fifty-four plies unidirectional prepreg tape measuring 12 inches by 18 inches comprised of AS4 carbon (obtainable from Hercules) and PMR-15 resin (obtainable from Dexter Composites, ICI Fiberite, or Ferro) were stacked together to create a laminate. These plies of tape were debulked every five plies under 29 inches of Hg vacuum to preconsolidate and hold the shape of the laminate. Removal of residual solvents and air was only a secondary concern since the reaction of PMR-15 produces significant volatiles, i.e., 17.1% by volume.

The AS4/PMR-15 laminate was then placed on forming tool 12. Nonporous release sheet 16, a CHEMFILM teflon sheet from Chem-Fab Corp., was placed above and below the PMR-15 laminate. A breather material 18 of 120 glass fabric (available from Airtech, Inc.) was placed on top of the system. Impermeable membrane 20, a KAPTON vacuum bag from DuPont de Nemours, E. I. & Co., Inc., was placed over the whole system and sealed to the forming tool 12 with GC-50-51 sealant from Programmed Composites.

Figure 2:
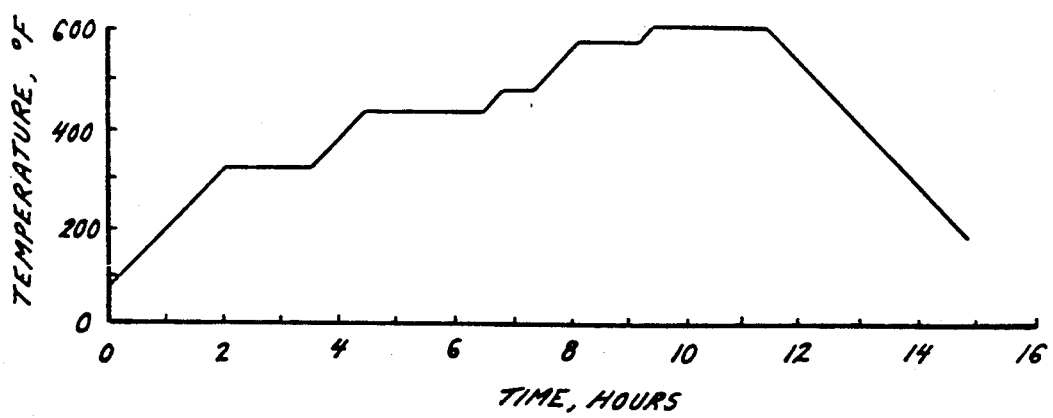
FIG. 2 is a diagram illustrating the heat and pressure cure cycle for the example presented herein.

The bagged laminate was then placed in an autoclave. As depicted in FIG. 2, three to five inches of Hg vacuum was applied while the system was heated from room temperature to 320° F. at 2° F./min. The temperature of 320° F. was maintained for 90 minutes. At the end of the hold, vacuum was increased to 29 inches of Hg. Heating continued at 2° F./min. until 435° F. was achieved. 435° F. was maintained for 120 minutes. The temperature was raised again to 475° F. at 2° F./min. Once 475° F. was achieved, 200 psig pressure was applied. The temperature was raised to 575° F. at 2° F./min., after the 200 psig pressure was achieved. The temperature of 575° F. was maintained for 60 minutes. The temperature was raised to 600° F. at 2° F./min. and held for 120 minutes. The laminate was then cooled at 2° F./min. to 180° F. Vacuum and pressure were released and the part was removed from the autoclave. A postcure in an oven set at 600° F. for 16 hours followed the autoclave run.

Upon examination of the molded laminate by acid digestion and ultrasonic c-scan, the surface finish was smooth and uniform and the void content within the laminate was 1.5% by volume; no resin was found upon examination of the breather material.

Other embodiments of the invention will be apparent to those skilled in the art from a consideration of this specification or practice of the invention disclosed herein. It is intended that the specification and example be considered as exemplary only, with the true scope and spirit of the invention being indicated by the following claims.

What is claimed is:

1. A method of vacuum molding composite materials, comprising the steps of:
   (a) laying up, on a forming tool, a plurality of prepregs, each comprising uncured resin-impregnated filaments;
   (b) overlaying said plurality of prepregs with at least one sheet of a nonporous material;
   (c) overlaying said nonporous material with a breather material;
   (d) enclosing said prepregs, said nonporous material, and said breather material within an impermeable membrane;
   (e) evacuating the volume enclosed by said impermeable membrane;
   (f) outgassing said resin in said prepregs;
   (g) coalescing said prepregs;
   (h) curing said resin; and
   (i) removing said composite material from said forming tool.

2. The method of vacuum molding composite materials as recited in claim 1, further comprising the step of sealing said impermeable membrane to the outer edges of said forming tool.

3. An apparatus for vacuum molding composite materials, comprising:
   (a) a forming tool;
   (b) a plurality of prepregs, each comprising uncured resin-impregnated filaments, which are layed-up on said forming tool;
   (c) a nonporous release sheet overlayed onto said plurality of prepregs;
   (d) a breather material overlayed onto said non-porous release sheet;
   (e) an impermeable membrane for enclosing said plurality of prepregs, said non-porous release sheet, and said breather sheet;
   (f) means for evacuating the volume enclosed by said impermeable membrane;
   (g) means for outgassing said resin in said prepregs; and
   (h) means for coalescing said prepregs.

4. The apparatus for vacuum molding composite materials as recited in claim 3, further comprising a nonporous release sheet sandwiched between said forming tool and said plurality of prepregs.

5. The apparatus for vacuum molding composite materials as recited in claim 3, wherein said outgassing means and said coalescing means is an autoclave.

* * * * *